(No Model.) 2 Sheets—Sheet 1.

A. ARRIETA.
MACHINE FOR THRASHING GRAIN.

No. 325,582. Patented Sept. 1, 1885.

Witnesses:
E. Everett Ellis
J. Frank White

Inventor:
Apolinar Arrieta
By O. E. Duffy
Washington, D.C. Atty.

(No Model.)  2 Sheets—Sheet 2.

A. ARRIETA.
MACHINE FOR THRASHING GRAIN.

No. 325,582.  Patented Sept. 1, 1885.

Witnesses.
Edward E. Ellis
A. Leo Duffy

Inventor:
Apolinar Arrieta
By
O. E. Duffy
Atty.

UNITED STATES PATENT OFFICE.

APOLINAR ARRIETA, OF PAMPLONA, SPAIN.

MACHINE FOR THRASHING GRAIN.

SPECIFICATION forming part of Letters Patent No. 325,582, dated September 1, 1885.

Application filed July 11, 1884. Renewed July 14, 1885. (No model.)

*To all whom it may concern:*

Be it known that I, APOLINAR ARRIETA, a citizen of the Kingdom of Spain, residing at Pamplona, in Spain, have invented a new and useful Machine for Thrashing Grain, of which the following is a specification.

Figure 1:
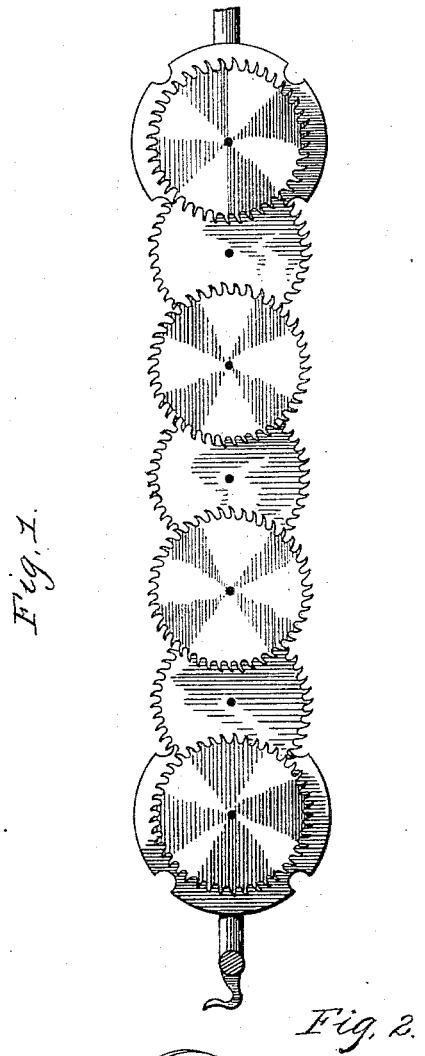
Figure 2:
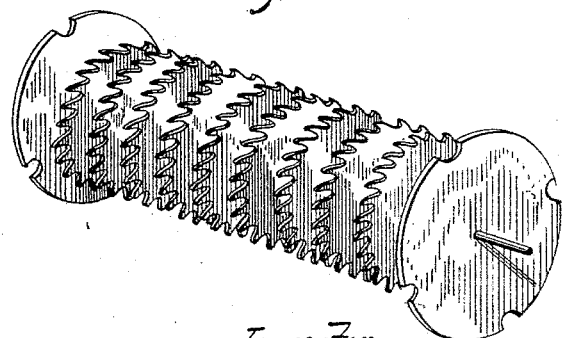
Figure 3:
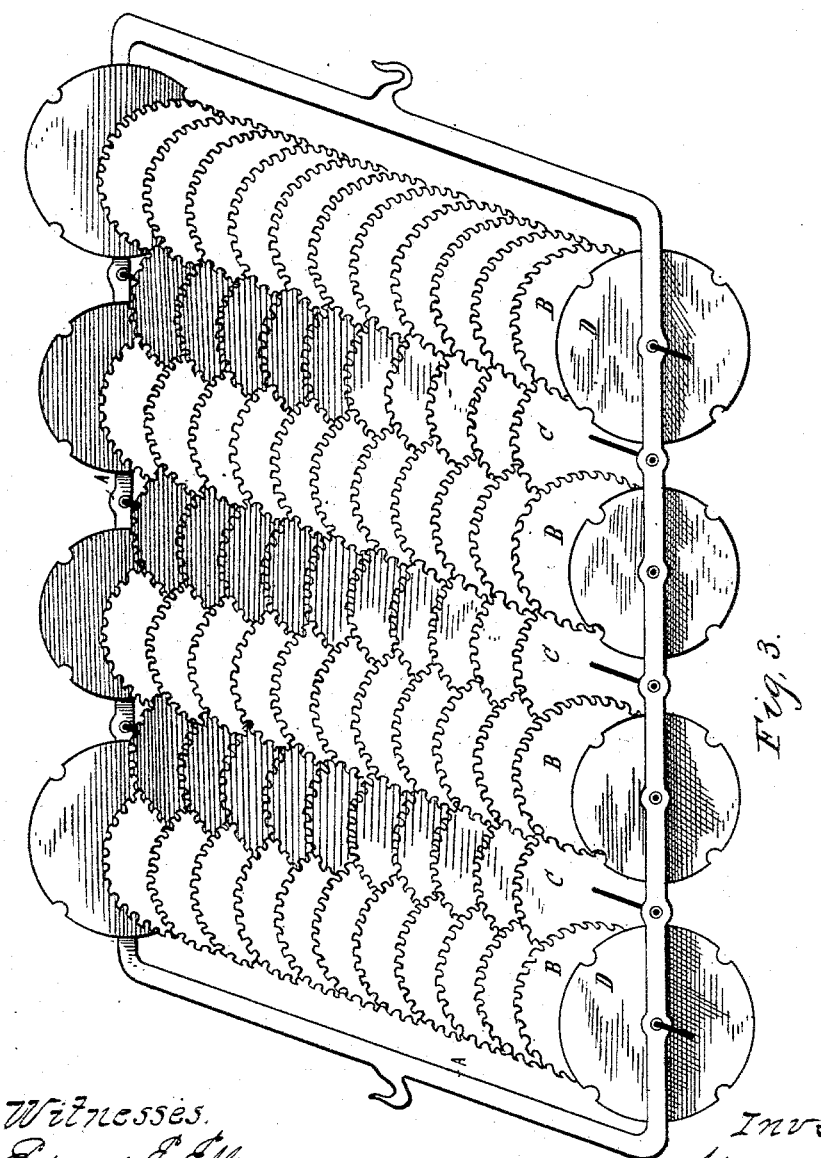

The machine is shown in elevation in Figure 1. Fig. 2 is one of the shafts detached and fitted with the saws. Fig. 3 represents in perspective a machine embodying my invention.

This machine presents the advantage of not crushing the grain; and it consists of a frame, A, preferably quadrangular, having hooks at the two ends by which a horse may be put to it. In this frame a number of shafts, B B, are mounted, preferably in brass bearings. On each shaft a number of circular saws of, say, seventeen centimeters diameter, are mounted. Rollers D are provided on some of the shafts, so as to prevent the saws touching the ground when the machine is in operation. The outermost shafts in the frame may be extended so as to serve as axles for wheels, which are placed on the machine for transport. This will be readily understood without being shown in the drawings.

In operation the grain is spread on the floor or ground, and the machine, without the wheels, drawn along the same by any suitable means. This causes rotation of the rollers, and consequently of the circular saws, which separate the grain from the straw.

I claim—

An improved machine for thrashing grain, comprising a frame, a number of shafts journaled therein, and circular saws mounted thereon, said shafts being adapted to revolve as the machine is drawn over the grain spread upon a thrashing-floor, substantially as described.

In witness whereof I have set my hand in the presence of two subscribing witnesses.

APOLINAR ARRIETA.

Witnesses:
 EMILE KAPP,
 ROBT. M. HOOPER.